United States Patent [19]

Cogswell et al.

[11] 4,438,236

[45] Mar. 20, 1984

[54] COMPOSITIONS OF MELT-PROCESSABLE POLYMERS HAVING IMPROVED PROCESSABILITY

[75] Inventors: Frederic N. Cogswell, Welwyn Garden City; Brian P. Griffin, St Albans; John B. Rose, Letchworth, all of England

[73] Assignee: Imperial Chemical Industries PLC, London, England

[21] Appl. No.: 388,462

[22] Filed: Jun. 14, 1982

Related U.S. Application Data

[63] Continuation-in-part of Ser. No. 207,708, Nov. 17, 1980, Pat. No. 4,386,174.

[30] Foreign Application Priority Data

Nov. 30, 1979 [GB] United Kingdom .................. 7941364
Nov. 30, 1979 [GB] United Kingdom .................. 7941365

[51] Int. Cl.³ .................. C08L 1/08; C08G 18/00; C08G 59/19; C08G 83/00
[52] U.S. Cl. .................. 525/165; 525/397; 525/425; 525/439; 525/444; 525/445; 525/502; 524/27
[58] Field of Search .................. 524/27, 35, 37, 38, 524/39, 40, 41, 42; 525/165, 397, 425, 444, 445, 439; 528/502

[56] References Cited

U.S. PATENT DOCUMENTS

| | | | |
|---|---|---|---|
| D. 904,029 | 11/1972 | Gaskin et al. .................. | 525/444 |
| 3,742,087 | 6/1973 | Nield .................. | 525/444 |
| 3,778,410 | 12/1973 | Kuhfuss et al. .................. | 260/47 C |
| 4,048,148 | 9/1977 | Morgan .................. | 260/72.5 |
| 4,067,852 | 1/1978 | Calundann .................. | 260/47 C |
| 4,130,545 | 12/1978 | Calundann .................. | 260/47 P |
| 4,157,360 | 6/1979 | Prevorsek et al. .................. | 525/444 |
| 4,161,470 | 7/1979 | Calundann .................. | 260/40 P |
| 4,267,289 | 5/1981 | Froix .................. | 525/444 |
| 4,281,077 | 7/1981 | Hirzy .................. | 525/444 |

FOREIGN PATENT DOCUMENTS 1507207 4/1978 United Kingdom .

*Primary Examiner*—John Kight, III
*Assistant Examiner*—Nathan M. Nutter
*Attorney, Agent, or Firm*—Cushman, Darby & Cushman

[57] ABSTRACT

A melt-processable composition comprising at least one polymer capable of forming an anisotropic melt and at least one other melt-processable polymer characterized in that the temperature range over which the polymer can form an anisotropic melt overlaps the temperature range over which the melt-processable polymer may be melt processed. The melt viscosity of such compositions may be very much less than that of the melt-processable polymer in the absence of the anisotropic melt-forming polymer particularly at high shear rates, corresponding to those encountered during moulding and extrusion operations. On the other hand at low shear rates and particularly when the concentration of anisotropic melt-forming polymer does not exceed 5% by weight increases in melt viscosity are obtainable which are valuable in fabrication processes operated at low shear rate where retention of form stability is required.

10 Claims, No Drawings

COMPOSITIONS OF MELT-PROCESSABLE POLYMERS HAVING IMPROVED PROCESSABILITY

This invention relates to a composition containing a melt-processable polymer and an anisotropic melt-forming polymer and to methods of improving the processability of melt-processable polymers. In some cases polymers which are not otherwise melt processable below their degradation temperatures may be rendered melt processable.

Melt-processable polymers are converted to shaped articles through a stage which involves obtaining the polymer in a molten state, that is in which individual particles of the polymer have been fused together. For easy processing it is necessary to achieve a melt viscosity which is sufficiently low to permit moulds to be filled completely without the use of abnormally high pressures. In the case of some polymers this is achieved at the expense of using such a high melt temperature that polymer degradation becomes a problem. Alternatively, the molecular weight must be restricted below the optimum value for the best mechanical properties.

Compositions have now been devised which enable the extent of this problem to be appreciably reduced, which permit reductions in melt viscosity to be obtained resulting in easier processing and which provide benefits in applications other than in the moulding application. For example, the invention also permits the melt viscosity of polymers under low shear conditions to be increased giving rise to advantages in processes where such viscosity characteristics are desirable.

According to the invention there is provided a melt-processable composition comprising at least one polymer capable of forming an anisotropic melt and at least one other melt-processable polymer characterised in that the temperature range over which the polymer can form an anisotropic melt and the temperature range over which the melt-processable polymer may be melt processed overlap, with the proviso that the melt-processable polymer other than that capable of forming an anisotropic melt may not become melt processable until blended with the anisotropic-melt-forming polymer. It is preferred that the extent of the overlap is at least 5° C. or more so that there is little difficulty in ensuring that the polymers are at a temperature at which the melt-processable polymer is in a molten state and the polymer capable of forming an anisotropic melt has formed an anisotropic melt.

By "a polymer capable of forming an anisotropic melt" is meant either that the polymer forms such a melt when heated to a particular temperature range, characteristic of the polymer (this type is termed a "thermotropic" polymer) or can be induced to form such a melt by the application of shear to the melt. The latter state is characterised by the persistence of the anisotropic condition for a period of a second or two after the melt ceases to be sheared. This distinguishes it from the well-known observation that a polyethylene terephthalate melt will exhibit order when sheared by passing the melt through a tube. Such order disappears immediately the melt ceases to be sheared. Some polymers may show both thermotropic and shear-induced anisotropy.

A major benefit obtainable from the composition of the invention is that the melt viscosity of the composition may be considerably reduced relative to that of the melt-processable polymer alone thereby permitting a lower processing temperature to be used. Compositions according to the invention may be produced which enable very substantial reductions in minimum processing temperatures, for example, 30° C. or more, to be achieved.

A further advantage which can arise when the compositions of the invention are subject to low shear rates is that the viscosity of the blended composition is higher than the viscosity of any of the polymeric components of the composition. This feature is particularly evident when the anisotropic melt-forming polymer is present in low concentration, that is at a concentration of not more than 5% by weight of the total polymeric components of the composition.

United Kingdom patent specification No. 2 008 598 discloses the reinforcement of a flexible polymer with up to 20% by weight of a rigid polymer dispersed as particles having a diameter of 1 micron or less. Although the definition of the rigid polymer by way of the Mark-Houwink index would include some polymers capable of forming an anisotropic melt there is no disclosure of such a melt, nor of a composition in which both flexible polymer and rigid polymer are present simultaneously in melt form. Furthermore, there is no recognition that the rigid polymer can improve the processability of the flexible polymer.

In the present invention it is essential that the composition be in molten form of some stage during processing or fabrication in order to obtain the advantages of the invention.

Accordingly there is provided a molten polymer composition characterised in that there coexist in the melt at least two polymers in melt form at least one of which is present as an anisotropic melt. The invention also includes shaped articles formed from such a melt.

The major advantages of the invention are that during processing the composition not only exhibits a reduced viscosity in comparison with the same composition not containing the anisotropic-melt-forming polymer but this in turn permits much greater freedom in processing conditions. Thus, the further advantages that may be obtained include the fact that the processing temperature may be reduced, larger mouldings may be filled, mouldings, having an intricate shape may be moulded with greater precision and fillers may be included at higher concentrations for a given melt viscosity than with previously known compositions. Further advantages arise from the manner in which the anisotropic-melt-forming polymer affects the viscosity of the melts of the compositions when subjected to various shear rates. At high shear rates, as encountered in moulding and other forming processes (about 100 to 1000 sec$^{-1}$), the compositions of the invention have a favourably low viscosity. An advantage of the low viscosity at the high shear encountered in the moulding process is that the finished shaped articles are subjected to reduced stress during fabrication so that the risk of subsequent warpage during use is reduced.

On the other hand, it is advantageous to have a high viscosity at low shear rates (about 10 sec$^{-1}$) so that form stability can be maintained, in situations where the melt is not shaped by a supporting mould. For example, unsupported extrudates or parisons for blow moulding should have sufficient form stability to retain the correct profile of the extrudate or the parison. The compositions of the invention can show this favourable pattern of behaviour. Apart from advantages arising from the reduced viscosity at high shear rates and increased viscosity at low shear rates benefits may be obtained through the presence of the anisotropic-melt-forming polymer per se. Thus, properties such as stiffness may be enhanced.

According to a further aspect of the invention there is provided a melt-processable composition comprising a melt-processable polymer and a sufficient quantity of a polymer capable of forming an anisotropic melt at a temperature within the processing temperature range of the melt-processable polymer to reduce the melt viscosity of the composition in comparison with the melt viscosity in the absence of the anisotropic-melt-forming polymer, by at least 10% measured at a shear rate of 1000 sec$^{-1}$ at a given processing temperature in the processing temperature range of the melt-processable polymer. The processing temperature range of a given melt-processable polymer is the range between the minimum temperature at which individual particles of the polymer are fused together when subjected to heat or to a combination of heat and work on the polymer and the maximum temperature at which the polymer can be processed before degradation of the polymer has an unacceptable effect on the properties of the polymer. It should be noted that in addition to reducing the minimum processing temperature of a normally processable polymer the invention includes the use of an anisotropic-melt-forming polymer to render processable a polymer which is not readily melt processable in the absence of the anisotropic-melt-forming polymer. For example, a polymer which is of such high molecular weight that it is not melt processable below its decomposition temperature may be rendered processable.

The invention also includes a method of producing a composition having a reduced melt viscosity comprising forming a melt of a melt-processable polymer containing a polymer which forms an anisotropic melt under the conditions used to melt the melt-processable polymer. Preferably sufficient of the anisotropic-melt-forming polymer is present to reduce the melt viscosity of the composition by at least 10%, (when measured at a shear rate in the range of 100 to 1000 sec$^{-1}$ at a temperature at which the composition is molten) in comparison with the composition not containing the anisotropic-melting-forming material.

The method of forming a melt in which the anisotropic behaviour of the anisotropic-melt-forming polymer may be observed is not limited simply to heating the composition to within an appropriate temperature range but includes the method of subjecting the composition to shear. The application of shear forces to the composition may induce anisotropic-melt behaviour in a situation where temperature alone does not induce anisotropy in the melt. In addition, the application of shear to systems which will form an anisotropic melt simply by raising the composition to an appropriate temperature range has the additional advantage that the temperature range over which an anisotropic melt is achieved can be extended.

The ability to provide compositions having a reduced processing temperature reduces energy consumption during processing but even more importantly greatly reduces the risk of thermal degradation. This is particularly important for polymers which are on the borderline of thermal stability at their normal processing temperatures.

The ability to reduce the processing temperature means that the minimum moulding temperature, that is the minimum temperature at which the mould may be completely filled without the pressure being so high that the mould opens, may be reduced. This can result in shorter cycle times, lower total energy costs (particularly important for high temperature processes) and a reduced risk of environmental hazard from gaseous products evolved during the moulding process.

In a further aspect of the invention there is provided a melt-processable composition comprising a melt-processable polymer and a sufficient quantity of a polymer capable of forming an anisotropic melt at a temperature within the processing range of the melt-processable polymer to increase the melt viscosity of the composition in comparison with the melt viscosity in the absence of the anisotropic melt-forming polymer by at least 10% when measured at a shear rate of 10 sec$^{-1}$.

The concentration of anisotropic melt-forming polymer used in compositions and methods of the invention is preferably between 0.5 and 50% by weight of the composition. Reductions in processing temperatures of 30° C. have been observed using as little as 3% of additive so that even 0.5% will show a significant reduction in high shear rate environments. The preferred upper limit for the additive is 50% although even higher concentrations may show an advantageous combination of properties. For most applications it is envisaged that concentrations between 1 and 20% will provide most of the advantages resulting from the reduction in melt viscosity. Increases in melt viscosity measured at low shear rates, that is in the range 10 sec$^{-1}$ up to 100 sec$^{-1}$, are normally achieved at concentrations in the range 0.5% to less than 5.0% by weight of the liquid crystal polymer.

Whilst the melt-processable polymer of the composition may itself be a liquid-crystal-forming polymer the invention is primarily directed to compositions of improved processability based on more conventional melt-processable polymers such as polyolefines, acrylic polymers, vinyl chloride and vinylidene-chloride-based polymers, polystyrene, polyphenylene oxide and polyphenylene oxide/polystyrene blends, fibre-forming aliphatic and aromatic polyamides, fibre-forming polyesters, polysulphones and polyethersulphones, polyketones and polyetherketones, polyfluoroolefines, polyoxymethylenes, thermoplastic cellulosic polymers, and other biologically produced polymers, such as poly(hydroxybutyrate). In addition to these thermoplastic materials the invention includes compositions of the thermosetting type providing they are melt processable. These include injection-mouldable polyurethanes and silicone rubbers, phenolic and amino moulding powders.

Although it is generally observed that some improvement results from blending anisotropic-melt-forming polymers with melt-processable polymers the optimum combination of materials will depend on the properties required of the blend. Thus, when the melt-processable polymer is a high performance polymer suitable for use in engineering applications it will be important to retain a high level of mechanical strength in the composition. In these circumstances excessive incompatibility between the components should be avoided because this will lead to mechanical weakness of the composition. As a general rule it is preferred that the compatibility as judged by the difference in solubility parameter (as calculated according to the method of Small, Journal of Applied Chemistry 1973 (3), page 71) should not exceed 2 units and, desirably, should not exceed 1 unit.

Preferred anisotropic-melt-forming polymers are substantially linear polymers within which are incorporated sequences of rigid units or linear vinyl polymers having pendant groups which are sufficiently stiff to give an anisotropic melt.

Typical are anisotropic-melt-forming polyesters described, for example, in British patent specification No. 1 507 207 and U.S. Pat. Nos. 3,778,410, 4,067,852, 4,083,829, 4,130,545 and 4,161,470. Polyazomethines which are capable of forming an anisotropic melt are described in U.S. Pat. No. 4,048,148. Polyesteramides which are capable of forming anisotropic melts are disclosed in European Patent Application No. 79 391 276. Polyisocyanates capable of forming anisotropic melts are described in the Journal of the American Chemical Society, Volume 12, No. 3, May–June 1979, pages 537 to 538.

Polyesters having pendant mesogenic vinyl groups are described in German patent application No. 27 22 589.

Other suitable materials include polycaprolactams or polycaprolactones which contain mesogenic groups. These materials may also include other substituents which reduce the softening point of the polymer. Hydroxypropyl cellulose, available as 'Klucel' from Hercules Inc may also be used.

A method for determining whether a polymer gives an anisotropic melt is described in British patent specification No. 1 507 207.

The compositions of the invention may include a variety of materials conventionally present in moulding compositions. These include fillers of the reinforcing or non-reinforcing type, in both fibrous or particulate form, pigments and other colourants, light and heat stabilisers, nucleants, mould release agents, plasticisers, fire-retardant additives, foaming agent and various other specific additives such as polymeric toughening agents.

In filled compositions which contain fibrous materials care should be taken to ensure that the melt viscosity of composition is not reduced to such a low level that it is difficult to maintain uniformity of distribution of the fibres in the melt. If the viscosity is too low problems may arise in either compounding or fabricating the composition because the fibres will not be conveyed along with the melt when the melt is caused to flow particularly through relatively narrow orifices.

The compositions may be prepared by the conventional techniques, such as by compounding in a screw extruder or in appropriate cases by including the materials during the polymerisation cycle or by blending in appropriate solvents. In the compositions of the invention produced by melt blending, the anisotropic-melt-forming polymer is typically dispersed in regions having a diameter of 5 to 10 microns. A finer dispersion may be obtained by solution blending.

In addition to the moulding applications described the invention is also suitable for use in areas such as melt adhesive applications, polymer melt coating technology, sheet welding and in forming structural composites, such as fibre mat laminates where the lower viscosity of the composition when used as an impregnation medium is advantageous.

The invention is further illustrated by reference to the following examples.

These examples show the improvement in processability obtained from blends according to the invention. In addition they show that for a given chemical family anisotropic-melt-forming polymers are more effective than isotropic-melt-forming polymers, particularly at the higher shear rates involved in, for example, injection moulding processing. This pattern of behaviour is still true for a variety of different methods of dispersing the anisotropic-melt-forming polymers in a given isotropic-melt-forming material and confirms this effectiveness of the anisotropic polymers compared with isotropic analogues. Furthermore, this difference is observed when the melt viscosity of the isotropic polymer is the same or even less than the anisotropic analogue.

EXAMPLE 1

This example illustrates the melt blending of a single liquid crystal species with a wide range of common thermoplastics.

3 Kilogrammes of copoly(chloro-1,4-phenylene ethylene dioxy-4,4'-dibenzoate) terephthalate; 50/50 mole basis were prepared according to the method of Example 3 of U.S. Pat. No. 3,991,013. A sample of polymer was extracted from the reaction mixture by cold extraction with trifluoroacetic acid:dichloromethane mixture (30:70 v/v) and the 83% of soluble polymer isolated by careful evaporation of the solvent under vacuum. The inherent viscosity of the soluble fraction measured at 25° C. on a 0.5% solution in the same solvent was 0.23 dl/g. The polymer itself melted at 220° C. to give an anisotropic melt which state persisted to temperatures of at least 320° C. This melt behaviour was observed using a Leitz hot stage fitted to a Leitz "SM POL" model polarising microscope. Melt viscosities of the polymer and blends of polymer as shown in Table 3 were measured using a capillary rheometer fitted with a 1 cm diameter piston and an exit die 1 mm in diameter and 16 mm in length. The melt viscosity $(Ns/m^2)^{(1)}$ results for a range of typical conditions for the anisotropic melt forming polymer were as follows:

TABLE 1

| Melt temperature (°C.) | Shear Stress[2] $(N/m^2)$ | | | |
|---|---|---|---|---|
|  | $3 \times 10^3$ | $10^4$ | $10^5$ | $3 \times 10^5$ |
| 220 | — | — | $2 \times 10^3$ | — |
| 230 | — | — | $4 \times 10^2$ | — |
| 240 | — | 85 | — | 40 |
| 250 | 28 | 16 | 13 | — |
| 260 | 6 | 6 | — | — |
| 270 | 4 | 4 | — | — |

(1) Viscosity calculated assuming shear stress divided by shear rate[3].

(2) Shear stress is taken to be:

$$\frac{\text{pressure drop} \times \text{die radius}}{2 \times \text{die length}}$$

(3) Shear rate is taken to be:

$$\frac{4 \times \text{volumetric flow rate}}{\pi \times (\text{die radius})^3}$$

Melt blends of the liquid crystal polymer and a range of base polymers in the weight ratio 10:90 were prepared by compounding tumble blended mixtures of the appropriate polymers in powdered form on a 19 mm single screw "Bone" extruder fitted with a 20 L/D screw, lace die, quench bath and lace cutter. The base polymers alone were also compounded under the same conditions. The compositions prepared are listed in Table 2 below:

TABLE 2

| Code | Base polymer type | Melt temp. (°C.) | Screw speed (rpm) | Drive motor current (Amps)* | Notes |
|---|---|---|---|---|---|
| A | Polypropylene | 230 | 52 | 1.2(1.3) | 'Propathene' grade GPE102 |
| B | LD polyethylene | 200 | 40 | 1.3(1.2) | 'Alkathene' grade XHF77/52 |
| C | Polycarbonate | 260 | 40 | 1.5(1.2) | 'Makrolon' grade 6030 |
| D | Polymethylmethacrylate | 250 | 40 | 1.21(1.2) | 'Diakon' grade MH254 |
| E | Nylon 66 | 280 | | 1.25(1.2) | 'Maranyl' A150 |
| F | Polyethyleneterephthalate | 270 | 40 | 1.2(1.2) | $[\eta] = 0.67$ |
| G | Polyphenylene oxide-polystyrene blend | 260 | 40 | 1.45(1.2) | 'Noryl' 730-731 |
| H | Polyvinyl chloride | 200 | 40 | 1.25(1.25) | 'Welvic' R7/622 |

*Figures thus (1.3) refer to the drive motor current consumed when compounding base polymer without liquid crystal additive.

Because the processing temperature of the PVC (H) (150° to 180° C.) did not overlap with the range in which this particular liquid crystal sample gives a stable anisotropic melt (200° to >320° C.) extrudates were rather decomposed and no useful product was obtained. The remainder of the blends gave good, coherent, uniformly mixed compositions. The melt viscosity of these and the parent materials were characterised as before and the results are given in Table 3 (melt viscosities Ns/m² at shear rates shown).

TABLE 3

| | | Base polymer (100%) Shear rates | | | Base polymer (90%) + liquid crystal polymer (10%) Shear rates | | |
|---|---|---|---|---|---|---|---|
| Code | Melt temp. (°C.) | 10 sec$^{-1}$ | 100 sec$^{-1}$ | 1000 sec$^{-1}$ | 10 sec$^{-1}$ | 100 sec$^{-1}$ | 1000 sec$^{-1}$ |
| A | 240 | 3850 | 950 | 185 | 1850 | 570 | 150 |
| B | 240 | 1220 | 490 | 150 | 1020 | 350 | 102 |
| C | 280 | 830 | 700 | 370 | 530 | 490 | 168 |
| D | 240 | 4400 | 1450 | 360 | 2800 | 960 | 270 |
| E | 280 | — | 940 | 325 | — | 190 | 76 |
| F | 280 | — | 210 | 150 | — | 21 | 21 |
| G | 280 | 2000 | 920 | 250 | 1600 | 500 | 106 |

These results indicate significant reductions in melt viscosity compared to the base polymer and in several cases the energy required to compound the blend is also significantly reduced.

Samples of the blends were successfully moulded on a small hand-operated plunger injection moulding machine ('Manumold' ). In the case of codes A, D, C, E and F material could be injected into the mould (3 mm×75 mm×50 mm) at the above melt temperatures with noticeably lower force than required for the base resins alone. All the mouldings had an acceptable surface finish and retained useful mechanical strength.

EXAMPLE 2

This example illustrates improvements in the flow behaviour of a polybutylene terephthalate (PBT) moulding powder by incorporation of a liquid crystal polyester (X7G) based on modified polyethylene terephthalate polymer.

An 80:20 melt blend of a poly(butylene terephthalte) moulding powder with an intrinsic viscosity of 0.9 g/dl (measured at 25° C. in a 98:2 o-chlorophenol:alpha-pinene mixture) with X7G* (a liquid crystal polymer based on a modified polyethylene terephthalte obtained from Eastman Kodak) was prepared at 240° C. on a single screw 38 mm Plastron extruder fitted with 30 L/D screw.

Melt flow indicies were measured at 240° C. on the apparatus used in Example 1 and gave the following relative values (expressed as mass/unit time):

| | MFI |
|---|---|
| PBT base resin | 100 |
| Liquid crystal polymer 'X7G' | 340 |
| Blend - 80% PBT + 20% 'X7G' | 228 |

Test pieces were injection moulded at 240° C. from the base resin and blend and gave yield or breaking values as follows:

100% PBT 60 MN/m² (necked and draw). Blend—80% PBT+20% 'X7G'* 50 MN/m² (broke before yield).

*'X7G' is understood to be a 40% mol % polyethylene terephthalate-60 mol % p-oxybenzoate copolyester prepared by the method of U.S. Pat. No. 3,778,410 and having an intrinsic viscosity of between 0.4 to 0.6 g/dl measured according to the method given in the patent.

EXAMPLE 3

This example describes the melt and solution blending of a single liquid crystal polyester composition with polyethersulphone over the complete concentration range. In both series similar and useful reductions in melt viscosity were obtained. In the case of 3 and 15% of liquid crystal polymer additive mechanical blends improved mouldability is demonstrated together with retention of useful mechanical strength.

Liquid crystal polyester-copoly(chloro-1,4-phenylene-4,4'-oxydibenzoate/terephthalate) 80/20 was prepared according to Example 4 in U.S. Pat. No. 3,991,014. The product, a tough, fibrous, tan coloured solid, had an inherent viscosity of 0.94 dl/g measured in a 0.5% solution in 70:30 v/v chloromethane:trifluoroacetic acid at 25° C. On the hot stage microscope the material melted at 285° C. to give a characteristic opaque anisotropic melt which state persisted up to at least 350° C. without significant decomposition. After disintegration into fine powder half the material was powder blended in different proportions with polyethersulphone (PES) polymer powder (ICI 'Victrex' grade 300P). The same series of blend compositions was also prepared by dissolving PES and the liquid crystal polymer in diphenyl sulphone solvent (at 50% w/w concentration) melted at 285° to 290° C., followed by cooling, disintegration and Soxhlet extraction with acetone for 18 hours. In one solution blending experiment in which PES was omitted the liquid crystal was recovered and shown to have an inherent solution viscosity of 0.78 g/dl.

The melt viscosity of each blend and the individual polymers of the blend was measured and is recorded in Table 4.

TABLE 4

| Blending ratio | | Melt viscosity (Ns/m²) at shear rates shown at 350° C. | | | | | |
|---|---|---|---|---|---|---|---|
| (parts by weight) | | Powder blends | | | Solution blends | | |
| PES | LCP* | 10 sec⁻¹ | 100 sec⁻¹ | 1000 sec⁻¹ | 10 sec⁻¹ | 100 sec⁻¹ | 1000 sec⁻¹ |
| 100 | — | 1650 | 1140 | 475 | — | 1080 | 490 |
| 90 | 10 | 1280 | 610 | 175 | — | 710 | 305 |
| 80 | 20 | 900 | 340 | 112 | — | 420 | 126 |
| 70 | 30 | — | 330 | 108 | — | 205 | 98 |
| 60 | 40 | — | 215 | 72 | — | 126 | 53 |
| 50 | 50 | — | 150 | 47 | — | — | 36 |
| 40 | 60 | — | 130 | 47 | — | 31 | 21 |
| 30 | 70 | — | 115 | 37 | — | — | 18 |
| 20 | 80 | — | 100 | 33 | — | — | 7.4 |
| 10 | 90 | — | 88 | 29 | — | — | 11.8 |
| — | 100 | — | 45 | 18 | — | 37 | 18 |

*LCP = Liquid crystal forming polymer.

Further batches of blend containing 3% and 15% LCP polymer were melt blended on the 37 "Bone" (19 mm) extruder and injection moulded on an Ankerwerke (V20/140) (170 g capacity) screw injection moulding machine to give 3 mm thick tensile impact bars. Whereas good quality full mouldings could not be produced from PES alone with melt temperatures much below 360° C., usefully strong, temperature resistant, opaque mouldings could be produced from the blends using melt temperatures as low as 285° C. The results of these experiments (designated Series I) are detailed in Table 5.

TABLE 5

| Blending ratio | | Melt temp. | Tensile strength | Fracture | Tensile impact strength | Vicat softening point (1 kg |
|---|---|---|---|---|---|---|
| PES | LCP | (°C.) | (MN/m²) | type | (NJ/m²) | at °C.) |
| 100 | — | 360 | 79.3 | Ductile | 227 | 226 |
| 97 | 3 | 360 | 78.5 | Brittle | 69 | 222 |
| | | 335 | 82.4 | Ductile | 187 | 222 |
| | | 315 | 79.1 | Ductile | 154 | 222 |
| | | 285 | 81.6 | Ductile | 191 | 222 |
| 85 | 15 | 360 | 68.1 | Brittle | 44 | 222 |
| | | 345 | 72.0 | Brittle | 49 | 222 |
| | | 325 | 67.2 | Brittle | 28 | 222 |
| | | 310 | 69.7 | Brittle | 29 | 222 |
| | | 295 | 48.1 | Brittle | 35 | 222 |

In further experiments (designated Series II) 3% blends were also successfully moulded on a "Stubbe" injection moulding machine fitted with edge gated 115 mm × 3 mm discs. As before it proved possible to mould the blend at considerably lower temperatures than the unmodified PES, the mouldings has good surface finish and retained a useful level of mechanical strength. Detailed results are shown in Table 6.

TABLE 6

| Blending ratio | | Melt temp. | Injection pressure | Notched impact strength (kJ/m²) | | Falling weight impact strength | Flexural modulus* (GN/m²) | | |
|---|---|---|---|---|---|---|---|---|---|
| 100 | — | 360 | 800 | 49.7 | 49.5 | 83.5 Ductile | 3.02 | 2.94 | 3.11 |
| 97 | 3 | 345 | 800 | 40.3 | 41.5 | 24.9 Brittle | 2.73 | 3.15 | 3.07 |
| 97 | 3 | 325 | 1000 | 35.5 | 34.0 | 5.4 Brittle | 3.07 | 3.13 | 3.13 |
| 97 | 3 | 325 | 1100 | 38.6 | 44.5 | 55.8 Ductile | 3.03 | 3.02 | 3.23 |
| 97 | 3 | 320 | 1000 | 55.4 | 39.2 | — | — | — | — |
| 97 | 3 | 315 | 1000 | 54.8 | 33.2 | — | — | — | — |

*Values given are measurement in following directions:
A = across below,
B = 45° C. to flow, and
C = along flow.

Melt viscosities of these blends were measured at 320° C. and various shear rates and the results are recorded in Table 7.

TABLE 7

| Moulding experiment series | Blending ratio | | Melt viscosity (Ns/m²) at 320° C. at specified shear rates | | |
|---|---|---|---|---|---|
| | PES | LCP | 10 sec⁻¹ | 100 sec⁻¹ | 1000 sec⁻¹ |
| Series I | 100 | — | 10000 | 4900 | 2300 |
| | 97 | 3 | 8300 | 3500 | 1200 |
| | 85 | 15 | 4500 | 1140 | 280 |
| Series II | 100 | — | 7600 | 3900 | 1180 |
| | 97 | 3 | 6900 | 3150 | 920 |

EXAMPLE 4

In this example preparation of highly glass-filled polyethersulphone compositions is described. In every case useful reductions in melt viscosity are obtained. In one case the effect of varying the base polymer to liquid crystal polymer ratio was studied.

A range of blends of polyethersulphone 'Victrex' grade 400P, chopped glass fibre and the liquid crystal forming polyester described in Example 1 were compounded together in a modified capillary rheometer, in the lower part of whose piston chamber was fitted a loose fitting cylindrical rotating bob. The surface of the bob had raised protuberances on its surface and it could be rotated at 200 rpm. The barrel of the viscometer was maintained at 300° C. and product was discharged via a 2 mm diameter die located near the lower edge of the cylinder, just below the bob. Lace from this unit was collected and its melt viscosity characterised as below. The results are tabulated in Table 8 for a sequence of runs carried out as follows:

In Run A initially an unmodified PES was processed. Addition of 10% LCP (Run B) gave a 50% drop in viscosity at the higher shear rates.

Addition of glass alone to PES (Run C) gave a 50% increase in viscosity but this could be largely off-set by addition of 10% LCP on polymer (Runs D and E). Increased glass levels (Runs F and G) in the presence of liquid crystal showed a steady increase in melt viscosity but these were still below that of the 30% glass-filled composition, without liquid crystal (C), until at least 50 to 60% of glass had been added. Above 70% glass content, a content which could not be reached in the absence of liquid crystal polymer, the resin tended to flow away from the glass causing the rheometer to block.

In a final series of experiments (Runs H and I) increasing the proportion of liquid crystal to base resin brought about a further reduction in melt viscosity. At very high levels the lubrication effect was so great that the resin ceased to be able to convey the glass fibre in a homogeneous way and again the die became blocked.

TABLE 8

| Run number | Composition of blend by weight | | | Melt viscosity at 320° C. (Ns/m² × 10⁻³) at stated shear rate | | |
|---|---|---|---|---|---|---|
| | PES | Glass | LCP | 10 sec⁻¹ | 100 sec⁻¹ | 1000 sec⁻¹ |
| A | 100 | — | — | 4.3 | 3.1 | 1.0 |
| B | 90 | — | 10 | 3.1 | 1.5 | 0.45 |
| C | 70 | 30 | — | 7.5 | 4.0 | 1.4 |
| D | 63 | 30 | 7 | 6.0 | 1.9 | 0.5 |
| E | 63 | 30 | 7 | 7.5 | 2.5 | 0.80 |
| F | 45 | 50 | 5 | 11 | 3.8 | 1.0 |
| G | 27 | 70 | 3 | 25 | 10 | — |
| H | 30 | 50 | 20 | 5.5 | 1.7 | 0.7 |
| I | 20 | 50 | 30 | would not extrude homogeneously | | |

EXAMPLE 5

In this example the melt compounding of a single liquid crystal composition with Nylon 66 and polycarbonate is described. In both cases 10% addition of liquid crystal produced a useful reduction in melt viscosity, and allowed injection mouldings of satisfactory strength to be fabricated.

A liquid crystal polyester as described in Example 1 was finely disintegrated and tumble blended with 9 times its weight of powdered dry Nylon 66 moulding powder and extrusion compounded on a Plastron single screw (38 mm diameter, L/D=24.5:1) extruder at a barrel temperature of 275° to 300° C. Coherent laces were easily obtained through a 3 mm diameter lace die. These were quenched in cold water and cut into 3 mm long pellets. In another variant a blend of 10% of the same liquid crystal polymer was mixed with 'Makrolon'3200 grade polycarbonate moulding powder at a temperature of 270° to 275° C.

Both blends were injection moulded at 280° C. on a V17 Ankerwerke single screw injection moulding machine fitted with a 115 mm×3 mm disc (edge gated) moulding maintained at 80° C. Unmodified nylon and polycarbonate were also moulded for comparison. Mechanical properties were determined and are tabulated below.

TABLE 9

| Blending ratio | | Flexural modulus (GN/m²) | | | Impact strength (kJ/m²) |
|---|---|---|---|---|---|
| | | A | B | C | |
| Nylon | LCP | | | | |
| 100 | — | (0.73)* | — | (0.72) | 2.1 (42) |
| 90 | 10 | (0.84) | — | (0.80) | 0.7 (41) |
| Polycarbonate | LCP | | | | |
| 100 | — | (2.49) | — | (2.55) | 48 (25) |
| 90 | 10 | (2.8) | — | (2.4) | 11 (1) |

*Figures in parentheses refer to mouldings which have been immersed in water at 25° C. for 170 hours, dried with a cloth and tested immediately.

It was noticeable that when the moulding pressure was set up to just fill the moulding with the base polymers, changing over to the liquid crystal blend caused the mould to overfill and flash. That this was associated with an effective drop in melt viscosity rather than degradation and reduction in molecular weight of the polyamide or polycarbonate was demonstrated by extracting the base resin from its blend with suitable solvents. After careful isolation solution viscosities were compared with those of the initial base polymers (using 0.5 g polymer in 100 ml solvent at 25° C.). The results obtained are shown in Table 10.

TABLE 10

| Blending ratio | | Extracted with | Solvent for determination of viscosity | $\eta_{rel}$ found |
|---|---|---|---|---|
| Nylon | LCP | | | |
| 100 | — | Formic acid | Formic acid | 1.455 |
| 90 | 10 | Formic acid | Formic acid | 1.529 |
| Polycarbonate | LCP | | | |
| 100 | — | Chloroform | Chloroform | 1.3116 |
| 90 | 10 | Chloroform | Chloroform | 1.3089 |

EXAMPLE 6

In this example the liquid crystal polyester described in Example 1 was powder blended with a polyetheretherketone polymer (PEEK) of sturcture shown below in the weight ratio 15:85 respectively:

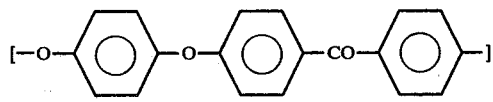

The powder blend was then fed to the modified capillary rheometer described in Example 4. The barrel and rotating bob of the apparatus were heated to 350° C. and the heat generated during shearing used to melt and blend the components. The pressure of the piston ram was adjusted to give an average residence time within the chamber of no more than 1 minute. The PEEK polymer without added liquid crystal forming polyester shear heated to about 490° C. In contrast the blend with liquid crystal shear heated to only 430° C. implying a significant reduction in melt viscosity has been achieved. Laces produced from the operation were collected, disintegrated and their melt viscosity characterised in the normal way at 380° C. The results in Table 11 below confirm the evidence of the shear heating experiment.

TABLE 11

| Blending ratio | | Melt viscosity (Ns/m²) at 380° C. and shear rates shown | |
|---|---|---|---|
| PEEK* | LCP | 100 sec⁻¹ | 1000 sec⁻¹ |
| 100 | — | 380 | 210 |
| 85 | 15 | 180 | 95 |

*Inherent viscosity at 25° C. of 0.8 dl/g measured on a 0.1% solution in sulphuric acid (100%).

EXAMPLE 7

In this example a range of different liquid crystal polyester compositions are mechanically blended at the 10% level with a range of conventional isotropic polymers. All show usefully reduced melt viscosities.

A range of liquid crystal polyesters were made by melt condensation reactions between appropriate aromatic and/or aliphatic dicarboxylic acids and the diacetates of dihydric phenols according to known procedures for forming polyesters. In other variants acetoxy parahydroxy benzoic acid was polycondensed with ε-caprolactam and with preformed polyethylene terephthalate polymer according to Example 1 of U.S. Pat. No. 3,778,410. The temperature at which each gave an anisotropic melt was determined on the hot stage microscope and the results are tabulated below (Table 12) together with the structural formulae of the original recipe ingredients and their molar ratios.

TABLE 12

| Polymer Code | Recipe ingredients charged to reactor | Polymer anisotropic melt temp. (°C.) |
|---|---|---|
| A | 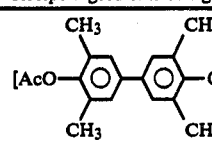 [HOCO—⌬—CO₂H]₀.₂₅ | 205 |
| B |  preformed PET polymer | 175 |
| C | 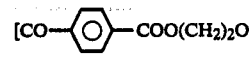  | 275 |
| D |  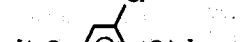 | 250 |
| E |  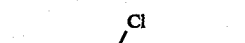 | 250 |
| F | 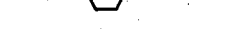 | 90 |
| G |   | 260 |
| H | 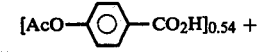 | 220 |

TABLE 12-continued

| Polymer Code | Recipe ingredients charged to reactor | Polymer anisotropic melt temp. (°C.) |
|---|---|---|
| I | [HOCO—⌬—O(CH$_2$)O—⌬—CO$_2$H]$_{0.25}$<br><br>[CO—⌬—COO(CH$_2$)$_2$O]$_{0.2}$ + [AcO—⌬(CH$_3$)$_2$—⌬(CH$_3$)$_2$—OAc]$_{0.4}$ +<br><br>preformed PET polymer<br><br>[HOCO—⌬—CO$_2$H]$_{0.4}$ | 230 |

10% liquid crystal polymer melt blends with either Nylon 66 ('Maranyl' A150 grade ex ICI), polycarbonate ('Makrolon' 3200 grade ex Bayer) or polyphenylene oxide-polystyrene blend ('Noryl' grade ex General Electric) were then prepared in an oil heated Brabender Plastograph (25 g total charge; 8 minutes total compounding time; mixer body temperatures of 281, 238 and 238° C. respectively for nylon, polycarbonate, polyphenylene oxide-polystyrene blend. Compared with the unmodified base resins the blends compounded more easily, judged by the torque reading on the mixer, and behaved as if they were highly lubricated in that they could be discharged easily without sticking to the metal surfaces of the mixer chamber or the mixing rotor. After cooling the compounded blends were disintegrated, dried and their melt viscosity determined on the capillary rheometer. The results obtained are shown in Table 13 and include data on a melt blend of Nylon 66 (90%) and poly(ethylene-vinyl acetate) (10%) for comparison.

TABLE 13

| Blending ratio (parts by weight) | Melt viscosity at 285° C. (Ns/m$^2$) at indicated shear rates | | |
|---|---|---|---|
| | 10 sec$^{-1}$ | 100 sec$^{-1}$ | 1000 sec$^{-1}$ |
| Nylon 66, 100 | 678 | 410 | — |
| Nylon 66, 90-A, 10 | 720 | 380 | — |
| Nylon 66, 90-B, 10 | 116 | 44 | 33 |
| Nylon 66, 90-C, 10 | — | 26 | — |
| Nylon 66, 90-D, 10 | — | 24 | 13 |
| Nylon 66, 90-E, 10 | — | 18 | — |
| Nylon 66, 90-F, 10 | — | 15 | 6.5 |
| Nylon 66, 90-G, 10 | — | 12.3 | — |
| Nylon 66, 90-H, 10 | 155 | 67 | 47 |
| Nylon 66, 90-EVA, 10* | 265 | 130 | 66 |
| Polycarbonate, 100 | 1440 | 1200 | — |
| Polycarbonate, 90-C, 10 | 1850 | 1300 | — |
| Polycarbonate, 90-I, 10 | 1280 | 870 | — |
| Polycarbonate, 90-A, 10 | 860 | 610 | — |
| Polycarbonate, 90-B, 10 | 620 | 360 | — |
| Polyphenylene oxide-polystyrene blends (PPO) | | | |
| PPO, 100 | 3030 | 1250 | — |
| PPO, 90-B, 10 | 2550 | 1150 | — |

*'Alkathene' grade 539 (ethylene-vinyl acetate copolymer) ex ICI

EXAMPLE 8

In this example a number of liquid crystal polyesters with anisotropic melting points within the normal processing range of rigid PVC were prepared. These were melt blended at the 10% levels in a Brabender Plastograph into a standard unplasticised rigid PVC formulation. Compared with the control the blends showed any or all of lower initial peak torque values and lower torque values after 5 minutes processing. The crepes produced were also of generally smoother surface finish and/or better colour than the controls indicating less degradation during processing.

A range of liquid crystal polyesters showing anisotropic behaviour within in the range 140° to 200° C. were prepared according to the general approach cited in Example 7. These were powder blended at the 1 and/or 10% levels with a standard rigid PVC formulation containing PVC (37 g 'Corvic' S62/109 grade ex ICI) and tribasic lead stearate powder (0.37 g) as stabiliser. Each blend mixture was charged to a standard Brabender Plastagraph (W30 Type Chamber) fitted with lobed rotors. The chamber was heated with circulating oil at 170° C. The peak torque reached initially was recorded together with the steady value attained after 5 minutes mixing. After discharge the compounded crepes were graded for discolouration and surface smoothness relative to the control.

Compositions of the liquid crystal polymers and their anisotropic melting range are given in Table 14. Properties of their blends with PVC are given in Table 15. Blends based on non-anisotropic melt forming additives (i.e. Polymer M, stearic acid, 'Diakon' APA-1 polymethyl methacrylate copolymer and di-n-butyl stearate) were also included for comparison.

TABLE 14

| Polymer Code | Recipe ingredients charged to reactor | Temperatures (°C.) where melts formed are: | |
|---|---|---|---|
| | | Anisotropic | Isotropic |
| B | [OC—⬡—CO(CH$_2$)$_2$O]$_{0.4}$ + [AcO—⬡—CO$_2$H]$_{0.6}$ preformed polymer | 175 | >300 |
| F | [AcO—⬡—CO$_2$H]$_{0.5}$ + [(CH$_2$)$_5$—CO—NH—]$_{0.5}$ | 195 | ≧330 |
| M | Polycaprolactone ex Union Carbide grade 0240 | — | >60 |
| J | [AcO—⬡—CO$_2$H]$_{0.6}$ + [AcO—⬡(CO$_2$H)—]$_{0.4}$ | 170 | >320 |

TABLE 15

| | Brabender torque readings (Nm) | | Crepe appearance | |
|---|---|---|---|---|
| | | | Smooth = 10 Very = 0 rough | White = 10 Dark brown/ = 0 black |
| Blending ratio PVC-Polyester | Initially | After 5 minutes | Surface finish | Colour |
| PVC, 100- — | 5500 | 2500 | 4.5 | 4.5 |
| PVC, 99-B, 1 | 7000 | 2480 | 7.5 | 6 |
| PVC, 90-B, 10 | 7000 | 2250 | 4 | 8 |
| PVC, 99-F, 1 | 6020 | 2390 | 7.5 | 8 |
| PVC, 90-F, 10 | 2950 | 1950 | 2 | 7 |
| PVC, 99-J, 1 | 6470 | 2460 | 5.5 | 8 |
| PVC, 90-J, 10 | — | — | — | — |
| PVC, 99-M, 1 | — | — | — | — |
| PVC, 90-M, 10 | 5100 | 2400 | 4 | 6 |
| PVC, 99-Stearic acid, 1 | 3650 | 2550 | 4 | 9 |
| PVC, 90-Stearic acid, 10 | 2250 | 1350 | 4 | 10 |
| PVC, 99-'Diakon' APA-1, 1 | 6600 | 2370 | 2 | 4 |
| PVC, 90-'Diakon' APA-1, 10 | 4700 | 2050 | 5 | 2 |
| PVC, 99-Di-n-butyl phthalate | 6020 | 2450 | 7.5 | 6 |

EXAMPLE 9

In this example a sample of high molecular weight HD polyethylene was blended with a liquid crystal polyester on a two-roll mill. This shows that the blend has a higher melt flow index than the control.

To a small electric mill, with the front roll set at 295° C. and rear roll at 225° C., was charged high molecular weight HD polyethylene ('Hostalen' grade GF 7750M, 60 g). As soon as the polyethylene was melted 17 g of the liquid crystal prepared and described in Example 1 was charged and milled until homogeneous to the eye (ca 4 minutes). The cold crepe was disintegrated and its melt flow index determined in comparison with a milled control without addition of the liquid crystal. Results are shown in Table 16 below.

TABLE 16

| | Melt flow indices (g/10 minutes) at stated temperatures | |
|---|---|---|
| Blending ratio | 190° C. | 250° C. |
| Control HDPE, 100 | 0.183 | 0.715 |
| HDPE, 78 - Liquid, 22 | 4.06 | 1.70 |

TABLE 16-continued

| | Melt flow indices (g/10 minutes) at stated temperatures | |
|---|---|---|
| Blending ratio | 190° C. | 250° C. |
| crystal | | |

Compression mouldings ca 0.5 mm thick were also prepared and compared for surface friction resistance on an inclined plane tester. Results, compared with other common plastics are given below, and indicate a useful improvement in relative surface slipperyness.

TABLE 17

| HDPE control | 21 |
|---|---|
| HDPE, 90 Liquid crystal blend, 10 | 16½ |
| Polystyrene | 22 |
| PTFE | 13 |
| Nylon 66 | 11½ |
| Rigid PVC | 16½ |
| LD Polyethylene | 41½ |
| Polypropylene | 17 |

TABLE 17-continued

M Film

EXAMPLE 10

In this example the addition of a liquid crystal polyester to commercial glass-filled PET moulding powders is described. The blends show lower melt viscosities. Processing temperature may therefore be reduced with the advantage that the risk of degradation is reduced.

Blends containing 10% of liquid crystal (IV=0.56 dl/g) described in Example 1, and 90% 'Rynite'* 530 and 545 grade glass-filled polyester (PET) moulding powders were prepared in the normal way on a "Bone" 19 mm extruder fitted with a 20 L/D screw, and lace die. After careful drying to avoid hydrolysis the disintegrated laces were characterised by melt flow index measurements on a Davenport flow tester fitted with a 2.096 mm diameter die, diameter piston falling under a 2.16 kg weight. The results given in Table 18 below show that at 285° C., the normal processing temperature for glass-filled PET, addition of liquid crystal resulted in a useful gain in melt index. Furthermore, when the temperature was reduced to 260° C., well below the recommended moulding temperature for PET, the liquid crystal blends with 'Rynite' 530 still showed melt indices comparable to the unmodified material.

TABLE 18

| Blend ratio | | MFI values (g/10 mins) at specified temperatures | |
|---|---|---|---|
| Liquid crystal | 'Rynite' 530 | 'Rynite' 545 | 260° C. | 285° C. |
| — | 100 | — | 3.2 | 38 |
| 10 | 90 | — | 31 | 91 |
| — | — | 100 | 2.8 | 21 |
| 10 | — | 90 | 8.1 | 66 |

*'Rynite' grade 530 made by Du Pont is believed to consist essentially of 70% polyethylene terephthalate modified with special crystallisation promoters and 30% glass fibre. 'Rynite' grade 545 is believed to be similar but containing 45% glass fibre.

EXAMPLE 11

In this example a series of closely related liquid crystal polyester chemical compositions are prepared in which by varying the proportion of para-linked units the whole range of behaviour from normal isotropic through to anisotropic liquid crystal melt behaviour is obtained. Solution and melt blends of each of these is then made with either, polyethersulphone, polycarbonate or polyphenylene oxide/polystyrene blend. Although most show some melt viscosity reduction compared with unmodified material these are very much more marked in the case of the blends with liquid crystal polymers than with the chemicaly related but isotropic compositions. Further, the extent of the viscosity reduction is qualitatively different and is often most marked in the case of the high shear rates, i.e. correspondingly most closely with the shear rates normally encountered in extrusion and injection moulding applications.

A series of copolyesters based on 4,4'-oxydibenzoic, isophthalic, and terephthalic acids and chlorohydroquinone was prepared using the procedure outlined in Example 3. By varying the proportion of isophthalic to terephthalic acid it was possible to make a complete series of closely related compositions with on the one hand normal isotropic behaviour (IA:TA≧80-90:20-10) and on the other hand anisotropic, liquid crystal behaviour (IA:TA ≦80-60:20-40). Other compositions representative of both these classes were made by partially or wholly replacing the chlorohydroquinone moiety by catechol. For further comparison a series of 10% blends with a higher molecular weight samples of the liquid crystal polyester of Example 1 was also included. Each sample was characterised as before by inherent viscosity tests (0.5% solution trifluoroacetic acid:dichloromethane 30:70 v/v at 25° C.), capillary rheometry and by its melting point and melt optical appearance on the polarising hot stage microscope. Results are given below in Table 19. Compositions are based on the following molar formula:

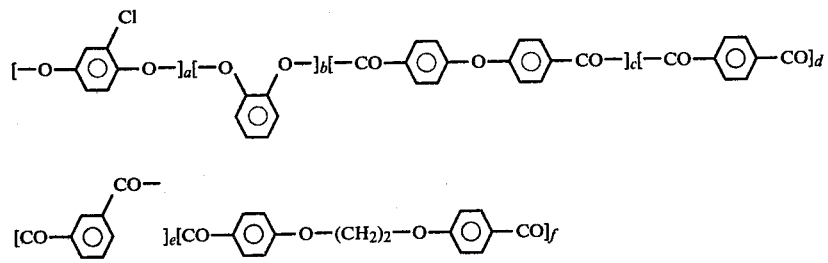

TABLE 19

| Liquid crystal polymer sample code | Polymer subunits (% molar reactants) | | | | | | IV (dl/g) | Melt viscosity (Ns/m²) at 285° C. at specified shear rates | | | Temperature (°C.) where melts formed are: | |
|---|---|---|---|---|---|---|---|---|---|---|---|---|
| | a | b | c | d | e | f | | 10 sec⁻¹ | 100 sec⁻¹ | 1000 sec⁻¹ | Anisotropic | Isotropic |
| A | 0.5 | — | 0.25 | 0 | 0.25 | — | 0.71 | 58000 | 21000 | 4500 | None | 270 |
| B | 0.5 | — | 0.25 | 0.025 | 0.225 | — | 0.48 | 4500 | 1900 | 450 | None | 215 |
| C | 0.5 | — | 0.25 | 0.05 | 0.2 | — | 0.3 | 360 | 175 | 75 | 200 | 240 |
| D | 0.5 | — | 0.25 | 0.08 | 0.17 | — | 0.35 | 55 | 28 | 14 | 190 | 290 |
| E | 0.5 | — | 0.25 | 0.125 | 0.125 | — | 0.6 | 1200 | 350 | 118 | 210-225 | 360-385 |
| F | 0.5 | — | 0.25 | 0.25 | 0 | — | 0.85 | 29 | 23 | 20 | 230-250 | >440 |
| G | 0.5 | — | 0.25 | 0.25 | 0 | — | 0.97 | 110 | 85 | 60 | not measured (2) | |
| H | 0.5 | — | 0.25 | 0.25 | 0 | — | 1.79 | 2000 | 850 | 200 | 240-260 | >440 |

TABLE 19-continued

| Liquid crystal polymer sample code | Polymer subunits (% molar reactants) | | | | | | IV (dl/g) | Melt viscosity (Ns/m²) at 285° C. at specified shear rates | | | Temperature (°C.) where melts formed are: | |
|---|---|---|---|---|---|---|---|---|---|---|---|---|
| | a | b | c | d | e | f | | 10 sec⁻¹ | 100 sec⁻¹ | 1000 sec⁻¹ | Anisotropic | Isotropic |
| I | 0.5 | — | 0.25 | 0.125 | 0.125 | — | 1.0 | 2000 | 750 | 150 | not measured (2) | |
| J | — | 0.5 | 0.25 | 0.25 | 0 | — | 0.25 | — | — | 3 | 150 | 155 |
| K | 0.5 | — | 0.25 | 0.125 | 0.125 | — | — | 3100 | 1050 | 260 | not measured (2) | |
| L | 0.25 | 0.25 | 0.25 | 0.25 | — | — | 0.52 | — | — | 40 | 200 | 395 |
| M | 0.125 | 0.375 | 0.25 | 0.25 | — | — | | | | | 160 | 180 |
| P | 0.5 | — | 0.2 | — | 0.3 | — | — | 3500 | 1200 | 270 | not measured (2) | |
| Q | 0.5 | — | 0.25 | 0.125 | 0.125 | — | 1.8 | 6500 | 1900 | 420 | not measured (2) | |
| R | 0.5 | — | 0.25 | 0.25 | — | — | 2.8 | ~11000 | ~3000 | ~600 | not measured (2) | |
| S | 0.5 | — | — | 0.25 | — | 0.25 | ≧1.1 | see note (1) | | | not measured (2) | |

Notes
(1) Viscosity determined at 270° C. and 10⁴ N/m² shear stress was 1600 Ns/m².
(2) Actual minimum temperatures where these showed anisotropic or isotropic melts were not determined exactly but were believed to be similar to those compositions of similar composition shown elsewhere in the table. In all cases they exhibited anisotropic melts in the temperature range of interest, i.e. 285–320° C. for the blends.

A series of solution blends with either polyethersulphone (ICI 'Victrex' grade P300), polycarbonate (*Markrolon*' 3200 grade ex Bayer), or 'Noryl' (polyphenylene oxide-polystyrene blend) were next prepared as follows. Liquid crystal polymer (1 g) was dissolved in trifluoracetic acid:dichloromethane (30:70 v/v) mixture (10 ml) and 9 g based polymer in the appropriate solvent (100 ml) mixed rapidly in appropriate solvents were:

polyethersulphone-trifluoracetic acid-dichloromethane (30:70)

polycarbonate-trifluoracetic acid-dichloromethane (30:70)

polyphenylene oxide-polystyrene blend-chloroform. When homogeneous the polymer blends were precipitated by pouring into methanol or acetone and isolated by filtratin and drying. The dry solids were finally soxhlet extracted with boiling ether followed by boiling methanol until free of residual acid solvent. After drying and grinding the melt viscosities were determined at the temperatures and shear rates shown in Table 20.

In a parallel series of experiments 10% melt blends using a laboratory sized Vickers 'Transfer mix' were prepared and characterised as above. Results on the melt blends are recorded in Table 21 below.

In many cases the base polymers were extracted from the blends with appropriate solvents and characterised by solution viscosity. The results showed that the fall in melt viscosity on blending could not be accounted for by degradation of the base polymer.

TABLE 20

Melt viscosity of blends prepared in solution

| Blend composition (%) | | Melt viscosity (Ns/m²) determined at stated shear rate and temp. | | | | Solution viscosity of based polymer extracted from extruded blend | |
|---|---|---|---|---|---|---|---|
| Base polymer Note (1) | LCP polymer Note (2) | Temp. (°C.) | 10 sec⁻¹ | 100 sec⁻¹ | 1000 sec⁻¹ | | |
| 100 PES | — | 320 | — | 5800 | 2150 | 0.47 | |
| 90 PES | 10 A | 320 | — | 4150 | 1150 | 0.47 | |
| 90 PES | 10 B | 320 | — | 3300 | 1000 | 0.43 | |
| 90 PES | 10 C | 320 | — | 1280 | 330 | 0.43 | ηsp |
| 90 PES | 10 D | 320 | — | 1150 | 42 | 0.44 | |
| 90 PES | 10 E | 320 | — | 850 | 300 | 0.44 | |
| 90 PES | 10 F | 320 | — | 650 | 270 | 0.45 | |
| 100 PC | — | 285 | — | 980 | 780 | 1.29 | |
| 90 PC | 10 A | 285 | — | 780 | 820 | 1.30 | |
| 90 PC | 10 B | 285 | — | 780 | 630 | 1.29 | |
| 90 PC | 10 C | 285 | — | 580 | 500 | 1.26 | ηrel |
| 90 PC | 10 D | 285 | — | 610 | 500 | 1.30 | |
| 90 PC | 10 E | 285 | — | 670 | 500 | 1.28 | |
| 100 PES | — | 320 | 9500 | 5300 | 1900 | | |
| 90 PES | 10 G | 320 | 3200 | 1300 | 450 | | |
| 90 PES | 10 H | 320 | 2800 | 1100 | 380 | | |
| 90 PES | 10 J | 320 | 800 | 800 | 600 | | |
| 100 PC | — | 280 | 2000 | 1900 | 1000 | | |
| 90 PC | 10 G | 280 | 1700 | 1000 | 420 | | |
| 90 PC | 10 H | 280 | 1100 | 800 | 400 | | |
| 90 PC | 10 J | 280 | 1000 | 930 | 700 | | |
| 100 PPO/PS | — | 320 | 1800 | 1000 | 380 | | |
| 90 PPO/PS | 10 G | 320 | 2800 | 810 | 230 | | |
| 90 PPO/PS | 10 H | 320 | 3200 | 850 | 260 | | |
| 90 PPO/PS | 10 J | 320 | 2000 | 1140 | 400 | | |
| 90 PPO/PS | 10 I | 320 | 2400 | 850 | 260 | | |
| 90 PPO/PS | 10 K | 320 | 2400 | 1220 | 350 | | |

TABLE 20-continued

| Blend composition (%) | | Melt viscosity (Ns/m$^2$) determined at stated shear rate and temp. | | | | Solution viscosity of based polymer extracted from extruded blend |
|---|---|---|---|---|---|---|
| Base polymer Note (1) | LCP polymer Note (2) | Temp. (°C.) | 10 sec$^{-1}$ | 100 sec$^{-1}$ | 1000 sec$^{-1}$ | |
| 90 PPO/PS | 10 A | 320 | 3400 | 1400 | 450 | |

Note (1)
PES = ICI 'Victrex' grade P300 polyethersulphone.
PC = 'Makrolon' grade 3000 polycarbonate.
PPO/PS = 50:50 blend purchased ex BDH Ltd.
Note (2)
For codes see Table 19.

TABLE 21

Melt viscosity of blends prepared by melt blending

| Blend composition (%) | | Melt viscosity (Ns/m$^2$) determined at stated shear rate and temp. | | | |
|---|---|---|---|---|---|
| Base polymer Note (1) | LCP polymer Note (2) | Temp. (°C.) | 10 sec$^{-1}$ | 100 sec$^{-1}$ | 1000 sec$^{-1}$ |
| 100 PES | — | 320 | 5000 | 4700 | 1700 |
| 90 PES | 10 A | 320 | 8000 | 4300 | 1300 |
| 90 PES | 10 E | 320 | 5000 | 1600 | 440 |
| 90 PES | 10 I | 320 | 7000 | 2500 | 700 |
| 90 PES | 10 F | 320 | 5300 | 2000 | 600 |
| 90 PES | 10 H | 320 | 6000 | 2500 | 700 |
| 90 PES | 10 G | 320 | 6500 | 2900 | 850 |
| 90 PES | 10 L | 320 | 6000 | 2600 | 900 |
| 90 PES | 10 J | 320 | 3400 | 2000 | 800 |
| 90 PES | 10 Q | 320 | 8500 | 3800 | 1100 |
| 90 PES | 10 K | 320 | 6500 | 3300 | 1100 |
| 90 PES | 10 R | 320 | 7000 | 2800 | 700 |
| 90 PES | 10 S | 320 | 6000 | 2200 | 650 |
| 100 PPO/PS | — | 320 | 700 | 530 | 240 |
| 90 PPO/PS | 10 J | 320 | 1200 | 420 | 160 |
| 90 PPO/PS | 10 M | 320 | 900 | 420 | 130 |
| 90 PPO/PS | 10 P | 320 | 600 | 260 | 110 |
| 90 PPO/PS | 10 Q | 320 | 1500 | 410 | 150 |
| 90 PPO/PS | 10 K | 320 | 1500 | 450 | 150 |
| 90 PPO/PS | 10 R | 320 | 900 | 330 | 110 |
| 90 PPO/PS | 10 S | 320 | 900 | 330 | 110 |
| 100 PC | — | 280 | 2000 | 1850 | 1000 |
| 90 PC | 10 J | 280 | 2000 | 1380 | 1000 |
| 90 PC | 10 P | 280 | 1900 | 1900 | 700 |
| 90 PC | 10 Q | 280 | 2200 | 1820 | 900 |
| 90 PC | 10 K | 280 | 2000 | 1100 | 700 |
| 90 PC | 10 R | 280 | 2000 | 1600 | 900 |

Note (1) - See Note (1) to Table 20.
Note (2) - For codes see Table 19.

These results show that at low shear rates the presence of an anisotropic melt-forming polymer can give a substantial increase in melt viscosity.

EXAMPLE 12

In this example substantially transparent blends of PES with a liquid crystal polyester at 3 and 15% are described. They are shown to have usefully reduced melt viscosities and are capable of injection moulding into clear tough mouldings at lower temperatures than are normally required for unmodified PES. Parallel experiments with a chemicaly similar non-anisotropic melt (i.e. isotropic) forming polymer are also described.

In comparison blends with the anisotropic material shows unexpected advantages of superior strength and temperature resistance.

A liquid crystal polyester based on equimolar amounts of terephthalic and isophthalic acids, hydroquinone and resorcinol (designated TIHR polymer) was prepared as follows:

In a three-necked flask fitted with take-off condenser and stirrer were placed a mixture of terephthalic acid (8.3 g equivalent to 0.05 mol), isophthalic acid (8.3 g equivalent to 0.05 mol), resorcinol diacetate (10.19 g equivalent to 0.0525 mol) and hydroquinone diacetate (10.19 g equivalent to 0.0525 mol). The contents were flushed with nitrogen for 30 minutes and then lowered into a molten metal bath at 250° C. Acetic acid (5 g equivalent to 80% theory) was evolved over a period of 1 hour. The contents were heated to about 90° C. and vacuum applied cautiously to avoid splashing. Stirring was continued over 1½ hours and vacuum applied and slowly increased from 50 to 1 mm Hg to remove residual acetic acid. The flask was removed from the metal bath and melt allowed to cool down under nitrogen. The cold solid was obtained by breaking the flask. The inherent viscosity measured at 30° C. in a 0.5% solution of 40:60 w/w sym-tetrachlorethane:phenol was 0.6 dl/g. On the hot stage microscope it melted at 225°-230° C. to give a characteristic anisotropic melt.

A resorcinol-isophthalate copolyester (designated RI polymer) prepared by an analogous procedure has a somewhat lower inherent viscosity of 0.3 to 0.4 dl/g. It melted at 185 to 190° C. to a non-anisotropic, i.e. isotropic normal melt.

To give a better comparison a higher molecular product (IV=0.8 dl/g) was also prepared by the interfacial polycondensation given in methods of British Pat. Nos. 907 047 and 902 021 (Example 1 in each case). It gave a similar isotropic melt at 200° C.

Melt blends of both these compositions were prepared at the 3, 10 and 15% levels with polyethersulphone by the method of Example 3 using a Bone 19 mm screw extruder. Several of these were injection moulded at between 280 and 360° C. to give substantially clear/translucent mouldings. The results obtained are shown in Table 22.

TABLE 22

| Blending ratio PES - LCP | Melt temp./ pressure °C./psi | Vicat softening point (°C.) at 1 kg | Impact strength | | Falling weight (J) 115 mm × 3 mm disc | Flexural modulus 115 mm × 3 mm disc (GN/m$^2$) | | | Melt viscosity (Ns/m$^2$) at shear rates shown | | |
|---|---|---|---|---|---|---|---|---|---|---|---|
| | | | Notched tensile (kJ/m$^2$) | | | | | | 10 sec$^{-1}$ | 100 sec$^{-1}$ | 1000 sec$^{-1}$ |
| | | | A | C | | A | B | C | | | |
| 100 — | 360/800 | 226 | 49.7 | 49.5 | 83.5 | 3.02 | 2.94 | 3.11 | ⎫ | ⎫ | ⎫ |
| 100 — | 360/1000 | 224 | 44.7 | 50.7 | — | — | — | — | ⎬ 8000 | ⎬ 4500 | ⎬ 1500 |
| 100 — | 330/1000 | 224 | 37.2 | 56.0 | — | — | — | — | ⎭ | ⎭ | ⎭ |

TABLE 22-continued

| Blending ratio PES - LCP | Melt temp./ pressure °C./psi | Vicat softening point (°C.) at 1 kg | Impact strength Notched tensile (kJ/m²) A | Impact strength Notched tensile (kJ/m²) C | Falling weight (J) 115 mm × 3 mm disc | Flexural modulus 115 mm × 3 mm disc (GN/m²) A | Flexural modulus 115 mm × 3 mm disc (GN/m²) B | Flexural modulus 115 mm × 3 mm disc (GN/m²) C | Melt viscosity (Ns/m²) at shear rates shown 10 sec⁻¹ | Melt viscosity (Ns/m²) at shear rates shown 100 sec⁻¹ | Melt viscosity (Ns/m²) at shear rates shown 1000 sec⁻¹ |
|---|---|---|---|---|---|---|---|---|---|---|---|
| 97 - 3 TIHR | 360/800 | | 24.1 | 21.7 | 64.5 | 3.44 | 3.34 | 3.34 | 3500 | 2100 | 700 |
| 97 - 3 TIHR | 355/900 | 214 | 32.0 | 33.3 | 54.4 | 3.04 | 3.12 | 2.97 | 3500 | 2100 | 700 |
| 97 - 3 TIHR | 315/1000 | | 24.6 | 33.1 | — | — | — | — | 3500 | 2100 | 700 |
| 85 - 15 TIHR | | | NOT INJECTION MOULDED | | | | | | 2600 | 1600 | 620 |
| 97 - 3 RI | 325/1000 | 208 | 14.2 | 18.2 | | | | | | | |
| 97 - 3 RI | 300/1000 | 208 | 19.1 | 19.2 | | | | | 6500 | 3400 | 1300 |
| 90 - 10 RI | 330/1000 | | 8.0 | 78 | | | | | | | |
| 90 - 10 RI | 300/1000 | | 5.1 | 4.9 | | | | | | | |
| 90 - 10 RI | 290/1000 | 196 | 3.9 | 4.0 | | | | | — | — | — |
| 90 - 10 RI | 280/1000 | | 7.7 | 7.6 | | | | | | | |
| 85 - 15 RI | | | NOT INJECTION MOULDED | | | | | | 1600 | 1600 | 1000 |

A = across, B = 45° to, and C = along flow direction.
Liquid crystal polymers: TIHR and RI have inherent viscosities of 0.5 amd 0.62 respectively.

EXAMPLE 13

ε-caprolactone (0.1 mole, 11.4 g) and para-acetoxybenzoic acid (0.1 mole, 18.0 g) were charged to a 100 ml 3-necked round-bottomed flask fitted with a nitrogen inlet, mechanical stirrer, and outlet to a solid $CO_2$ trap and vacuum pump. The apparatus was purged with nitrogen for 1 hour. The flask was immersed in a metal bath at 200° C., and the temperature raised to 235° C. over 20 minutes. At this temperature distillation of acetic acid from a clear melt was observed. The temperature of 235° C. was maintained for 1 hours, and then increased to 255° C. for ¼ hour. Vacuum was then applied, for a total period of 4 hours, at a temperature of about 255° C.

The flask was cooled under vacuum, atmospheric pressure re-established using nitrogen and the flask broken to recover the product.

The product was found to exhibit liquid crystal behaviour between about 63° C. and 275° C., and 0.1 parts of the product (designated LCP) was added to chloroform (9 parts). The mixture was shaken and gave a fine dispersion of polymer in the chloroform. A solution of biologically produced poly(hydroxybutyrate) (PHB) (1 part) in chloroform (9 parts) was prepared and mixed with the dispersion of liquid crystal forming polymer. The polymer mixture was isolated by evaporating the chloroform in a room of dry air at 40° C. and subsequently drying at 40° C. under vacuum overnight.

A sample of the mixture of polymers was assessed in a Melt Flow Grader according to method and apparatus of British Standard 2782:7:720A (1979).

The sample was charged to the barrel of a Melt Flow Grader and extruded through a standard die (2.1 mm diameter × 8 mm long) using a 10 kg load on the piston to provide the pressure. The Mass Flow was recorded each minute after the load was applied and the Mass Flow Rate (g/min) is recorded in Table 23. In Table 23 the mass extruded during the period 3 to 4 minutes being recorded as the Mass Flow Rate after 4 minutes. During the early part of this experiment the temperature of the sample is increasing towards the set temperature and an estimate of the sample mean temperature (assuming a thermal diffusivity of $10^{-7}$ m²/s) is included in Table 23.

Tests were carried out at 180° C. and 190° C. The superiority of the flow of the modified polymers is most clearly demonstrated at 180° C. It can be inferred from a graphical representation that the modified samples melt about 7° C. lower in temperature than the control and then have significantly greater fluidity.

TABLE 23

| Set Temperature (°C.) | Time (min) | Polymer Temperature (Estimated °C.) | PHB Melt Flow Rate (g/min) | PHB + 10% LCP Melt Flow Rate (g/min) |
|---|---|---|---|---|
| 190 | 1 | 167 | — | 0.03 |
| | 2 | 183 | 0.05 | 0.12 |
| | 3 | 188 | 0.09 | 0.18 |
| | 4 | 190 | 0.15 | 0.24 |
| | 5 | 190 | 0.28 | 0.60 |
| | 6 | 190 | 0.75 | 1.0 |
| 180 | 1 | 157 | — | — |
| | 2 | 173 | — | — |
| | 3 | 178 | — | 0.03 |
| | 4 | 180 | — | 0.05 |
| | 5 | 180 | 0.018 | 0.08 |
| | 6 | 180 | 0.028 | 0.12 |
| | 7 | 180 | 0.040 | 0.23 |
| | 8 | 180 | 0.060 | 0.45 |
| | 9 | 180 | 0.12 | 0.80 |
| | 10 | 180 | 0.25 | — |

EXAMPLE 14

Samples of PHB containing 10% by weight of 'Klucel' were prepared from chloroform solutions and then isolated as described in Example 13. The dried samples were evaluated in the melt flow grader at 180° C. and 190° C. in comparison with PHB alone. The results obtained were very similar to those obtained in Example 13, again indicating that the processing temperature of the PHB could be reduced.

EXAMPLE 15

A polyesteramide was prepared from p-acetoxyacetanilide (1.1 mole), azelaic acid (1.1 mole) and p-acetoxybenzoic acid (1.65 mole) as described in Example 1 of U.S. Pat. No. 3,859,251. The polymer produced was found to exhibit liquid crystal behaviour when heated to a temperature above 240° C. The polymer was melt blended with various polymers as indicated below using a Vickers 'Transfer mix' screw blender. The viscosity of the blend at low and high shear rate is also recorded in Table 24:

TABLE 24

| Blend Composition (%) | | Temp. | Melt Viscosity (Ns/m²) at stated shear rate and temperature | |
|---|---|---|---|---|
| LCP | Base polymer | (°C.) | 70 sec⁻¹ | 960 sec⁻¹ |
| 10 | 90 nylon 66 | 285 | 792 | 65 |
| 0 | 100 nylon 66 | 285 | 693 | 218 |
| 10 | 90 'Diakon'* CA603 | 240 | 2070 | 287 |
| 0 | 100 'Diakon'* CA603 | 240 | 1610 | 531 |
| 10 | 90 PES (300P) | 350 | 990 | 341 |
| 0 | 100 PES (300P) | 350 | 1680 | 646 |
| 10 | 90 'Noryl' (PPO/PS) | 285 | 990 | 196 |
| 0 | 100 'Noryl' (PPO/PS) | 285 | 1980 | 392 |

*'Diakon' CA603 is a polymethyl methacrylate powder.

EXAMPLE 16

A 250 ml 3-necked flask fitted with $N_2$ inlet, dropping funnel, stirrer and condenser and drying tube, was charged with 45 g (0.2 mole 97%) 2,5-di-aminotoluene sulphate and 100 ml dimethylacetamide (DMAc) containing 5% dissolved LiCl. The mix was warmed and 40 ml phridine added to help solution. The mix was then cooled and with fairly vigorous stirring 26.8 g (0.2 mole). Terephthaldialdehyde in 50 ml DMAc was quickly added via the dropping funnel. The mix turned orange-yellow and became very viscous and paste-like so that more DMAc had to be added to enable stirring to be efficient. The ingredients were stirred for 7 hours and then allowed to stand overnight before pouring into water (with stirring) in a blender. The orange-yellow solid was filtered off washed several times in water and acetone and vacuum oven dried.

The polymer exhibited a liquid crystal melt at 270° C. up to about 360° C. when it set up.

The polymer obtained was melt blended with polyethylene terephthalate powder of intrinsic viscosity 0.75 (10 parts polyazomethine to 90 parts PET). When measured at 285° C. at a shear rate of 70 sec⁻¹ the viscosity was 162 Ns/m² which was identical with a control sample of PET. At a shear rate of 960 sec⁻¹ the viscosity of the blend was 28 Ns/m² compared with 69 Ns/m² for the PET control.

EXAMPLE 17

In this example two different liquid crystal polyesters were used to determine their effect on the viscosity characteristics of polyamides and glass-reinforced polyamides.

An anisotropic polyester having the molar formula:

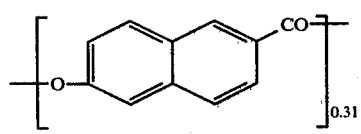
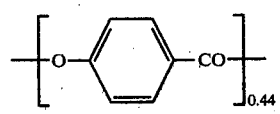
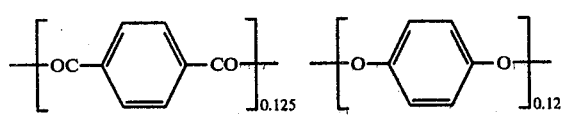

was prepared according to the procedures described in U.S. Pat. No. 4,219,461. The product had a melt viscosity of 13 Ns/m² measured at a shear rate of 100 sec⁻¹. This polymer is designated Polymer A in the table below.

A second anisotropic polyester having the molar formula:

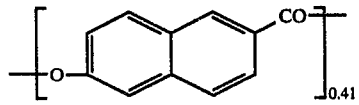
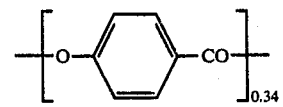
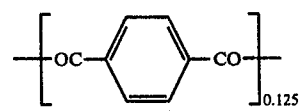
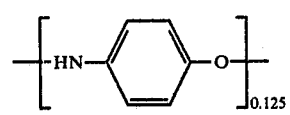

was prepared using the procedures descried in U.S. Pat. No. 4,219,461 but substituting p-aminophenol for the hydroquinone constitutent of the first polyester. The product (designated Polyester B) had a melt viscosity of 1800 Ns/m² measured at a shear rate of 100 sec⁻¹.

Each of the above polyesters was blended over a range of concentrations with a nylon 66 polyamide (having an inherent viscosity of 1.8 measured on a 0.5% by weight solution in 90% formic acid) using a Betol screw extruder at a temperature of 300° C. The melt viscosity of the products was determined at 285° C. over a range of shear rates. The results obtained are recorded in the table below. The viscosity data is expressed as a Viscosity Ratio, that is the ratio of the viscosity of the blend to the viscosity of the polyamide X100. Values over 100 indicate that the anisotropic polyester additive has caused an increase in melt viscosity at the given shear rate.

TABLE 25

| Polyester concentration in blend (% by wt) | Polyester type | Viscosity ratio at shear rates of | | |
|---|---|---|---|---|
| | | 10 sec⁻¹ | 100 sec⁻¹ | 1000 sec⁻¹ |
| 10 | A | 30 | 31 | 21 |
| 7 | A | 80 | 83 | 63 |
| 5 | A | 104 | 101 | 76 |
| 2 | A | 270 | 180 | 100 |
| 1 | A | 200 | 183 | 115 |
| 10 | B | 60 | 51 | 54 |
| 2 | B | 180 | 166 | 110 |

The two polyesters prepared above were also blended by extrusion compounding with a glass-reinforced nylon 66 composition containing 33% by weight of glass fibres having a number average fibre length of about 0.25 mm. The melt viscosity of the compositions was determined at various shear rates at 285° C. The results obtained are given in the table below.

TABLE 26

| Polyester concentration in blend (% by wt) | Polyester type | Viscosity ratio at shear rates of | | |
|---|---|---|---|---|
| | | 10 sec$^{-1}$ | 100 sec$^{-1}$ | 1000 sec$^{-1}$ |
| 10 | A | — | 47 | 34 |
| 7 | A | — | 86 | 65 |
| 5 | A | — | 115 | 81 |
| 2 | A | — | 141 | 100 |
| 1 | A | — | 129 | 103 |
| 10 | B | — | 49 | 18 |
| 5 | B | — | 101 | 85 |
| 1 | B | — | 115 | 97 |

These results show that at low shear ratios, i.e. 100 sec$^{-1}$ or less, and particularly at low concentrations of anisotropic melt-forming polymer substantial increases in melt viscosity can be achieved.

EXAMPLE 18

This example illustrates the effect of two different anisotropic polyesters on the viscosity characteristics of a polyvinyl chloride formulation.

An anisotropic polyester having the molar formula:

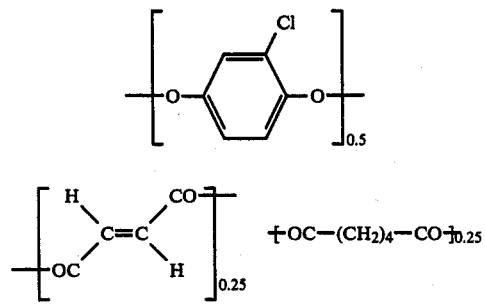

(designated Sample X) was prepared according to the procedures disclosed in European Patent Publication No. 51934.

A second polyester having the molar formula:

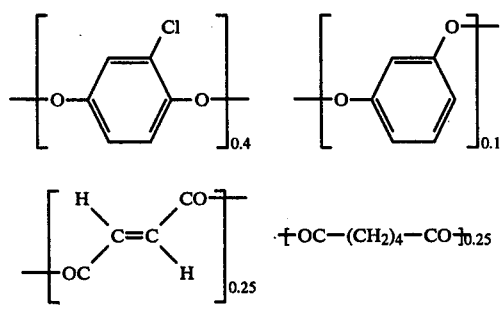

(designated Sample Y) according to the procedures of the same disclosure.

Each of these polyesters was blended in a Brabender Plastograph at 170° C. with a polyvinyl chloride composition consisting of 100 parts 'Corvic' S62/109 (a grade of PVC supplied by ICI PLC), 2 parts tribasic lead sulphate and 1 part lead stearate. The viscosity characteristis of compositions containing various proportions of the anisotropic polyesters described above were measured at 180° C. and the results obtained at various shear rates are tabulated below.

TABLE 27

| Type of anisotropic additive | Concentration of anisotropic in blend (% by weight) | Viscosity ratio at shear rates of | | |
|---|---|---|---|---|
| | | 10 sec$^{-1}$ | 100 sec$^{-1}$ | 1000 sec$^{-1}$ |
| X | 5 | 150 | 140 | 98 |
| X | 15 | — | 63 | 58 |
| X | 20 | 54 | 40 | 44 |
| Y | 5 | 230 | 180 | 96 |
| Y | 20 | 80 | 66 | 69 |

We claim:

1. A melt-processable polymer composition comprising from 0.5 to 5.0% by weight of the composition of at least one polymer capable of forming an anisotropic melt and at least one other melt-processable polymer characterised in that the temperature range over which the polymer can form an anisotropic melt and the temperature range over which the melt-processable polymer may be melt processed overlap, with the proviso that the other melt-processable polymer may not become melt processable until blended with the anisotropic-melt-forming polymer.

2. A melt-processable polymer composition according to claim 1 characterised in that the temperature range over which the polymer which is capable of forming an anisotropic melt is present as an anisotropic melt and the temperature range over which the melt-processable polymer may be melt processed overlap by at least 5° C.

3. A melt-processable polymer composition according to either of claims 1 or 2 characterised in that the composition contains a sufficient quantity of the polymer capable of forming an anisotropic melt at a temperature within the processing temperature range of the melt-processable polymer to increase the melt viscosity of the composition in comparison with the melt viscosity in the absence of the anisotropic-melt-forming polymer, by at least 10% measured at a shear rate of 10 sec$^{-1}$ at a given processing temperature in the processing temperature range of the melt-processable polymer.

4. A melt-processable polymer composition according to claim 1 characterised in that it has been produced by forming a melt from a polymer exhibiting anisotropic melt form and a melt-processable polymer which is molten at the temperature at which the anisotropic melt is formed.

5. A melt-processable polymer composition according to claim 1 characterised in that the composition is formed from a solution of the melt-processable polymer and the polymer capable of exhibiting an anisotropic melt.

6. A molten polymer composition characterized in that there coexist in the melt at least two polymers in melt form at least one of which is present in an amount of from 0.5 to 5.0% by weight of the composition and which is an anisotropic melt forming polymer and which acts to increase the melt viscosity of the molten composition compared with the melt viscosity of the composition when said anisotropic melt forming polymer is not present.

7. A method of improving the processability of a melt processable polymer comprising forming a blend of from 0.5 to 5.0% by weight of the composition of a melt-processable polymer with a second polymer characterized in that the melt of the second polymer is an anisotropic melt and acts to increase the viscosity of the molten blend in comparison with the composition not containing the anisotropic melt forming material.

8. A method of improving the processability of a melt-processable polymer according to claim 7 characterised in that the melt contains sufficient of the anisotropic melt to increase the melt viscosity of the composition by at least 10% (when measured at a shear rate of 10 sec$^{-1}$ at a temperature at which the composition is molten) in comparison with the composition not containing the anisotropic-melt-forming material.

9. A melt-processable polymer composition according to claim 3 containing from 2 to 80% by weight of the composition of reinforcing or non-reinforcing fillers.

10. A shaped article obtained from a molten polymer composition according to claim 6.